Patented Sept. 2, 1930

1,774,771

UNITED STATES PATENT OFFICE

KARL STEJSKAL, OF VIENNA, AUSTRIA

PROCESS FOR THE PRODUCTION OF NUTRITIVE SUBSTANCES

No Drawing. Application filed April 21, 1927, Serial No. 185,663, and in Austria May 17, 1926.

It is known to introduce medicaments into the body percutaneously, by mixing these medicaments with fat and rubbing the fatty mixture into the skin.

The present invention aims at the further problem, of incorporating by the same percutaneous method, as much nutritive material as will be sufficient for a time for the requirements of the organism in cases in which digestive organs cannot take in enough nourishment or must not be subjected to any strain. For the human organism the chief nutritive materials which come into question, apart from fats, are carbohydrates and proteins or decomposition products of proteins.

Experiments have shown that the problem aimed at by the invention cannot be solved with the known means.

In the first place use cannot be made of fat in ointment form, because in this form too little passes through the skin and the large surface of the skin cannot be utilized to its full extent for resorption purposes. According to the invention therefore the fat is converted into the form of an emulsion; this would appear to ensure absorption and enable an easier and fuller use. Moreover it has been found that the introduction of nutritive substances through the skin is extremely unsatisfactory not only in the case of fat itself, but also in the case of carbohydrates and protein, if the material which is rubbed in contains a great deal of free water. The latter is however to a very large extent essential in order to dissolve the considerable quantities of sugar, if for instance it is desired to introduce into the mixture the amount of sugar required for purposes of nourishment. The invention obviates the drawback by employing substances which bind water, and even dissolve the sugar directly without water, for instance glycerine. The latter has in addition the advantage, as a nutritive material which is consumed in the body, of increasing per se the nutritive value of the emulsion.

In the same way, proteins or their decomposition products by themselves or in combination with sugar or carbohydrates can be prepared in a concentrated solution and when glycerine is used as water-binding substance the capacity of fixing water not only extends to the free water in the proteins incorporated in the emulsion, but also to the perspiration given off by the body when the substances are rubbed in.

According to the invention the nutritive substances can be prepared in such highly concentrated form and such a strong capacity for penetrating the skin can be imparted to this product that in cases of emergency sufficient nourishment can be obtained by rubbing in alone.

A substance to be rubbed in according to the invention and sufficient for maintaining the vital functions, consists for example of an emulsion of oil, sugar and protein or of fat in general with sugar and protein, the composition of the individual ingredients depending upon the number of calories, which are to be introduced into the body with each ingredient.

An emulsion according to the invention has for instance the following composition:

It contains in 100 g.: 30 g. dextrose—viz. 47.5% consumable carbohydrates; 17.5 g. glycerine, 35 g. fat, 17.5 g. yolk of egg containing 6.5 g. protein.

200 g. of this emulsion, which can be incorporated, contain about 940 calories.

The fat employed can be for instance animal fat such as lard or butter or a vegetable oil such as for instance olive oil.

In place of the yolk of egg use may also be made of any other protein preparation such as for instance a yeast preparation or derivative.

The glycerines or other glycols and all products thereof can also serve as solvent for various amino acids, such as glycochol and other decomposition products of proteins or albuminose preparations, such as yeast autolysates, which are to be introduced into the body in addition to proteins or as protein substitute.

Naturally it is possible by this means also to introduce into the body other nutritive agents, as well as other kinds of sugar, other fats and proteins and other water-fixing substances by emulsification or dissolving.

What I claim is:

1. A method for the production of nutritive substances adapted to be introduced into the body through the skin in large quantities, consisting in preparing an anhydrous emulsion of fat with a water binding liquid substance, and incorporating therewith carbohydrates and proteins and their decomposition products without incorporating thereby any non-nutritive substances, the water binding substances absorbing any water which may be contained in the other ingredients and also the water which may be present in the skin at the place of application of the media so that thereby a nutritive substance is obtained which can easily be incorporated through the skin.

2. A method for the production of nutrient substances as claimed in claim 1, characterized by the feature that water-binding agents including glycerine are employed which can be consumed in the body.

3. A process for the preparation of nutrient media as claimed in claim 1, characterized by the feature that highly concentrated fat emulsions not containing free water but containing nutritious carbohydrates are prepared by dissolving said carbohydrates in glycerine, and these sugar glycerine solutions being mixed with fats in the desired proportions.

4. A process for the preparation of the nutrient media as claimed in claim 1, characterized by the feature that highly concentrated emulsions of fat, and albuminous substances and their decomposition products are prepared by introducing the albuminous substances in glycerine and associating this mixture very thoroughly with fats in the desired proportions.

In witness whereof I have hereunto signed my name.

PROF. DR. K. STEJSKAL.